(12) United States Patent
Kim et al.

(10) Patent No.: US 11,471,744 B2
(45) Date of Patent: Oct. 18, 2022

(54) DISTANCE INFORMATION CALCULATION METHOD AND ELECTRONIC DEVICE WHERE THE METHOD IS APPLIED

(71) Applicant: VC INC., Seoul (KR)

(72) Inventors: Juno Kim, Seongnam-si (KR);
Hakyong Lee, Yongin-si (KR);
Hohyeong Lee, Seoul (KR)

(73) Assignee: VC INC., Seoul (KR)

( * ) Notice: Subject to any disclaimer, the term of this patent is extended or adjusted under 35 U.S.C. 154(b) by 379 days.

(21) Appl. No.: 16/808,519

(22) Filed: Mar. 4, 2020

(65) Prior Publication Data
US 2020/0282287 A1 Sep. 10, 2020

(30) Foreign Application Priority Data
Mar. 4, 2019 (KR) .......................... 10-2019-0024775

(51) Int. Cl.
*A63B 69/36* (2006.01)
*A63B 71/06* (2006.01)
(Continued)

(52) U.S. Cl.
CPC .......... *A63B 71/0619* (2013.01); *A63B 57/60* (2015.10); *G01C 15/002* (2013.01);
(Continued)

(58) Field of Classification Search
CPC . A63B 69/36; A63B 69/3605; A63B 24/0021; A63B 2071/0691; A63B 2220/20
See application file for complete search history.

(56) References Cited

U.S. PATENT DOCUMENTS 4,260,151 A * 4/1981 Weaver .............. A63B 69/3676
33/283
4,698,781 A * 10/1987 Cockerell, Jr. ....... G01S 5/0009
701/438
(Continued)

FOREIGN PATENT DOCUMENTS

KR 10-2014-0104253 8/2014
KR 10-2018-0099443 9/2018

OTHER PUBLICATIONS

"SkyCaddie Touch User Guide," Copyright 2015 Skyhawk Technologies, LLC. (Year: 2015).*
(Continued)

*Primary Examiner* — Steven J Hylinski
(74) *Attorney, Agent, or Firm* — Lex IP Meister, PLLC

(57) ABSTRACT

A method for calculating distance information according to the present invention includes: acquiring a current location; reading out map information of a golf course corresponding to the current location; calculating a horizontal distance to a target of the golf course from the current location by using the map information; calculating two first direction intersection where a straight line in a first direction, connecting the current location and the target, and a green boundary line of the golf course meet; calculating two second direction intersection where a straight line, which is perpendicular to the first direction and passes through the target, and the green boundary line meet; and calculating edge distances between the target and the two first direction intersection and between the target and the two second direction intersection.

4 Claims, 11 Drawing Sheets

(51) Int. Cl.
*A63B 57/60* (2015.01)
*H04W 4/029* (2018.01)
*G01C 15/00* (2006.01)
*A63B 102/32* (2015.01)

(52) U.S. Cl.
CPC ..... *H04W 4/029* (2018.02); *A63B 2071/0691* (2013.01); *A63B 2102/32* (2015.10); *A63B 2220/14* (2013.01); *A63B 2220/20* (2013.01)

(56) References Cited

U.S. PATENT DOCUMENTS

| | | | | | |
|---|---|---|---|---|---|
| 4,910,677 | A | * | 3/1990 | Remedio | A63B 71/0669 700/92 |
| 5,095,430 | A | * | 3/1992 | Bonito | A63B 55/61 473/150 |
| 5,319,548 | A | * | 6/1994 | Germain | A63B 71/06 273/DIG. 26 |
| 5,324,028 | A | * | 6/1994 | Luna | A63B 69/36 473/409 |
| 5,582,566 | A | * | 12/1996 | Imasaka | G01S 13/76 702/158 |
| 5,689,431 | A | * | 11/1997 | Rudow | G01S 19/071 701/461 |
| 5,691,922 | A | * | 11/1997 | McEwan | G01S 13/876 702/158 |
| 5,797,809 | A | * | 8/1998 | Hyuga | A63B 71/0669 340/539.2 |
| 5,873,797 | A | * | 2/1999 | Garn | A63B 55/61 473/409 |
| 6,024,655 | A | * | 2/2000 | Coffee | G01C 21/30 701/472 |
| 6,227,973 | B1 | * | 5/2001 | Kikuchi | A63F 13/5378 273/317.1 |
| 6,278,402 | B1 | * | 8/2001 | Pippin | G01S 19/074 342/357.44 |
| 6,456,938 | B1 | * | 9/2002 | Barnard | G01S 19/19 701/487 |
| 6,873,406 | B1 | * | 3/2005 | Hines | G01S 17/10 356/5.01 |
| 7,121,962 | B2 | * | 10/2006 | Reeves | A63B 71/0622 463/41 |
| 7,239,377 | B2 | * | 7/2007 | Vermillion | G01S 17/86 356/5.01 |
| 7,684,017 | B2 | * | 3/2010 | Hocknell | G01S 17/88 356/5.01 |
| 8,070,628 | B2 | * | 12/2011 | Denton | A63B 57/00 473/407 |
| 8,491,421 | B1 | * | 7/2013 | Scott | A63B 69/3623 473/404 |
| 9,095,761 | B2 | * | 8/2015 | Trenkle | A63B 71/0619 |
| 10,369,451 | B2 | * | 8/2019 | Park | G01S 19/35 |
| 2004/0147329 | A1 | * | 7/2004 | Meadows | G01S 19/19 473/131 |
| 2008/0201107 | A1 | * | 8/2008 | Doherty | G09B 19/0038 702/182 |
| 2009/0082139 | A1 | * | 3/2009 | Hart | A63B 24/0003 473/409 |
| 2010/0179005 | A1 | * | 7/2010 | Meadows | G06F 16/9537 473/409 |
| 2011/0076657 | A1 | * | 3/2011 | Forest | G01S 19/19 434/252 |
| 2011/0191023 | A1 | * | 8/2011 | Engstrom | G01C 21/20 701/532 |
| 2014/0315660 | A1 | * | 10/2014 | Edmonson | G01S 19/39 473/407 |
| 2015/0126308 | A1 | * | 5/2015 | Penn | A63B 69/3605 473/407 |
| 2019/0094343 | A1 | * | 3/2019 | Nyhart | G01S 7/481 |
| 2019/0374834 | A1 | * | 12/2019 | Edmonson | A63B 1/00 |
| 2020/0158873 | A1 | * | 5/2020 | Kim | G01S 17/88 |

OTHER PUBLICATIONS

"Skycaddie Touch GPS Review—What do we make of the new Touch from SkyCaddie?" by Andy Roberts, Published Mar. 24, 2015. Source:https://www.golfmagic.com/reviews/equipment/skycaddie-touch-gps-review/21046 (Year: 2015).*

"SkyCaddie SX500 User Guide," Copyright 2018 Skyhawk Technologies, LLC. (Year: 2018).*

"SkyCaddie SX500 GPS—How would we rank the new SkyCaddie SX500 GPS?" by Joel Tadman, published Oct. 17, 2018. Source: https://www.golfmonthly.com/reviews/gps/skycaddie-sx500-gps (Year: 2018).*

"SkyCaddie SGXw Player's Guide," Copyright 2001-2012 SkyHawke Technologies, LLC. (Year: 2012).*

* cited by examiner

DISTANCE INFORMATION CALCULATION METHOD AND ELECTRONIC DEVICE WHERE THE METHOD IS APPLIED

CROSS-REFERENCE TO RELATED APPLICATION

This application claims priority to and the benefit of Korean Patent Application No. 10-2019-0024775 filed in the Korean Intellectual Property Office on Mar. 4, 2019, the entire contents of which are incorporated herein by reference.

BACKGROUND OF THE INVENTION

(a) Field of the Invention

The present disclosure relates to a distance information calculation method and an electronic device where the method is applied.

(b) Description of the Related Art

Golf is a sport in which golf balls are hit and put into holes. A golfer determines a target spot in consideration of the current location of a golf ball and a hole location, and selects a proper golf club and hits the golf ball to move the golf ball to the target hole.

The golfer refers to flags (or pins) placed in the hole and distance marking fixtures provided along the fairway to determine the location of the hole and the distance from the current location to the hole. However, locations of holes are arbitrary, and thus the fixtures cannot accurately reflect the locations of the holes. Thus, the golfer cannot accurately determine the distance from a current location to the hole.

Recently, a distance measurement device using a distance measurement sensor to accurately measure a distance in a field has been released. The distance measurement device measures the distance to the hole by emitting light and sound waves toward the target and receiving light and sound waves reflected from the pins.

However, even when such a distance measurement sensor is used, there is a problem of guiding the golfer's determination of a distance to an object other than the pin by mistake of the golfer's pin aim. In addition, there is a limit in accurately displaying the position of the hole in the green.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for calculating distance information to provide an accurate distance to a hole, and display a location of the hole on the green, and an electronic device to which the method is applied.

An electronic device according to one feature of the present invention to solve the above-stated problem includes: a memory where map information of golf courses is stored; a location acquisition sensor that acquires a current location; and a control portion, wherein the control portion may read out map information of a golf course corresponding to the current location from the memory, calculates a horizontal distance to a target of the golf course from the current location by using the map information, calculate two first direction intersection where a straight line in a first direction, which connects the current location and the target, and a green boundary line of the golf course meet, calculates two second direction intersection where a straight line, which is perpendicular to the first direction and passes through the target, and the green boundary line meet, and calculate edge distances between the target and the two first direction intersection and between the target and the two second direction intersection. The electronic device may further include an output portion that outputs information with respect to the target and the edge distances.

The electronic device further includes: a distance measurement sensor that measures a straight distance to the target from the electronic device; and an acceleration sensor that measures a tilt angle at which the electronic device faces toward the target, wherein the control portion may calculate a first horizontal distance according to the measured straight distance and the tilt angle.

The electronic device further includes an azimuth sensor that measures an azimuth angle at which the electronic device faces toward the target, wherein the control portion may calculate coordinates of the target by using the azimuth angle and the first horizontal distance, generate a straight line that connects the green boundary line, coordinates of the current location, and the coordinates of the target, calculate at least two intersections where the straight line and the green boundary line meet, and calculate distances from the coordinates of the current location to the at least two intersections, respectively, and determines the first horizontal distance as the horizontal distance when the first horizontal distance is longer than the shortest distance among the calculated distances and shorter than the longest distance among the calculated distances.

A method for calculating distance information according to another feature of the present invention includes: acquiring a current location; reading out map information of a golf course corresponding to the current location; calculating a horizontal distance to a target of the golf course from the current location by using the map information; calculating two first direction intersection where a straight line in a first direction, connecting the current location and the target, and a green boundary line of the golf course meet; calculating two second direction intersection where a straight line, which is perpendicular to the first direction and passes through the target, and the green boundary line meet; and calculating edge distances between the target and the two first direction intersection and between the target and the two second direction intersection.

The method for calculating the distance information may further include: measuring a straight distance from an electronic device to the target; measuring a tilt angle at which the electronic device faces toward the target; and calculating a first horizontal distance according to the measured straight distance and the tilt angle.

The method for calculating the distance information may further include: measuring an azimuth angle at which the electronic device faces toward the target; calculating coordinates of the target by using the azimuth angle and the first horizontal distance; generating a straight line that connects the green boundary line, the coordinates of the current location, and the target; calculating at least two intersections where the straight line and the green boundary line meet; calculating distances from the coordinates of the current location to the at least two intersections, respectively; comparing the first horizontal distance with the shortest distance and the longest distance among the calculated distances; and according to a result of the comparison, determining the first horizontal distance as the horizontal distance when the first horizontal distance is longer than the shortest distance and shorter than the longest distance.

The distance information calculation method according to the present disclosure, and the electronic device to which the distance information calculation method is applied may enable a golfer to easily determine a location of a hole, and easily recognize a location of a hole in the green.

Additional ranges of applicability of the present disclosure will become apparent from the detailed description below. However, since various modifications and alternations within the spirit and scope of the present invention may be clearly understood by those skilled in the art, it is to be understood that a detailed description and a specific exemplary embodiment of the present invention such as an exemplary embodiment of the present invention are provided only by way of example.

DETAILED DESCRIPTION OF THE EMBODIMENTS

Figure 1:
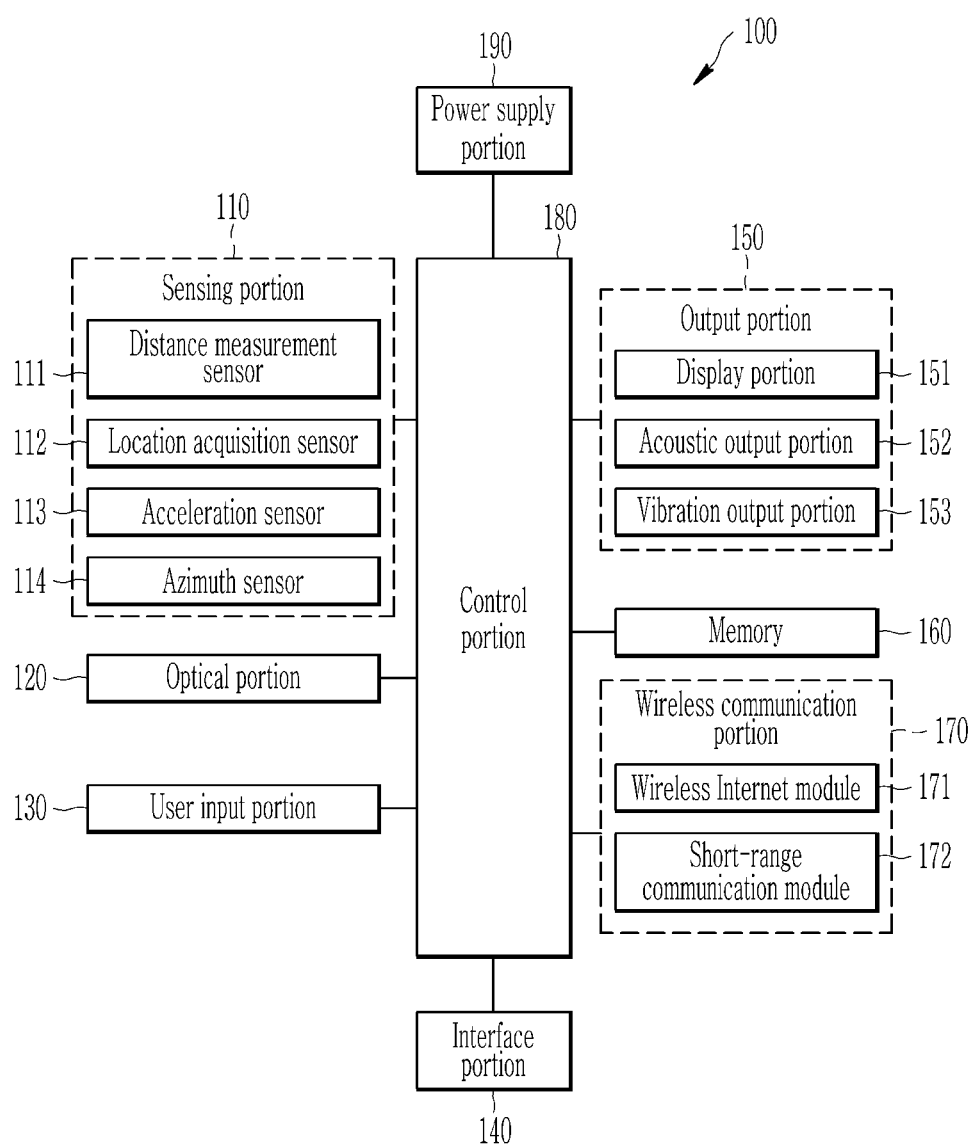
FIG. 1 is a block diagram provided for description of a distance measurement device according to an exemplary embodiment.

Hereinafter, exemplary embodiments disclosed herein will be described in detail with reference to the accompanying drawings, and the same or similar components will be given the same or similar reference numerals, and redundant description thereof will be omitted. The suffixes "module" and "portion" for constituent elements used in the following description are given or used in consideration of the ease of specification, and do not have specific meanings or roles. In the description of the exemplary embodiments disclosed in the present specification, when it is determined that the detailed description of related known technology may obscure the gist of the exemplary embodiments disclosed in the present specification, the detailed description thereof will be omitted. In addition, the accompanying drawings are only for easily understanding the exemplary embodiments disclosed in the present specification, and the technical ideas disclosed in the present specification are not limited by the attached drawings, and it should be understood that all alterations, equivalents, and substitutes included in the spirit and technical range of the present invention are included.

Terms containing ordinal numbers such as first and second can be used to describe various constituent elements, but the constituent elements are not limited by the terms. The terms are used only to distinguish one constituent element from other constituent elements.

It should be understood that, when it is described that a component is "connected to" or "accesses" another component, the component may be directly connected to or access the other component, or a third component may be present therebetween. In contrast, it should be understood that, when it is described that a component is "directly connected to" or "directly access" another component, it is understood that no element is present therebetween.

In the present application, it should be understood that the term "include" or "have" indicates that a feature, a number, a step, an operation, a component, or a part or a combination thereof described in the specification is present, but does not exclude a possibility of presence or addition of one or more other features, numbers, steps, operations, components, parts, or combinations thereof, in advance.

Exemplary embodiments according to the present invention can be implemented by various electronic devices. An electronic device according to exemplary embodiments may include a memory, and may be controlled according to a program or an application stored in the memory.

First, a distance measurement device according to an exemplary embodiment of the present invention will be described.

Figure 2:
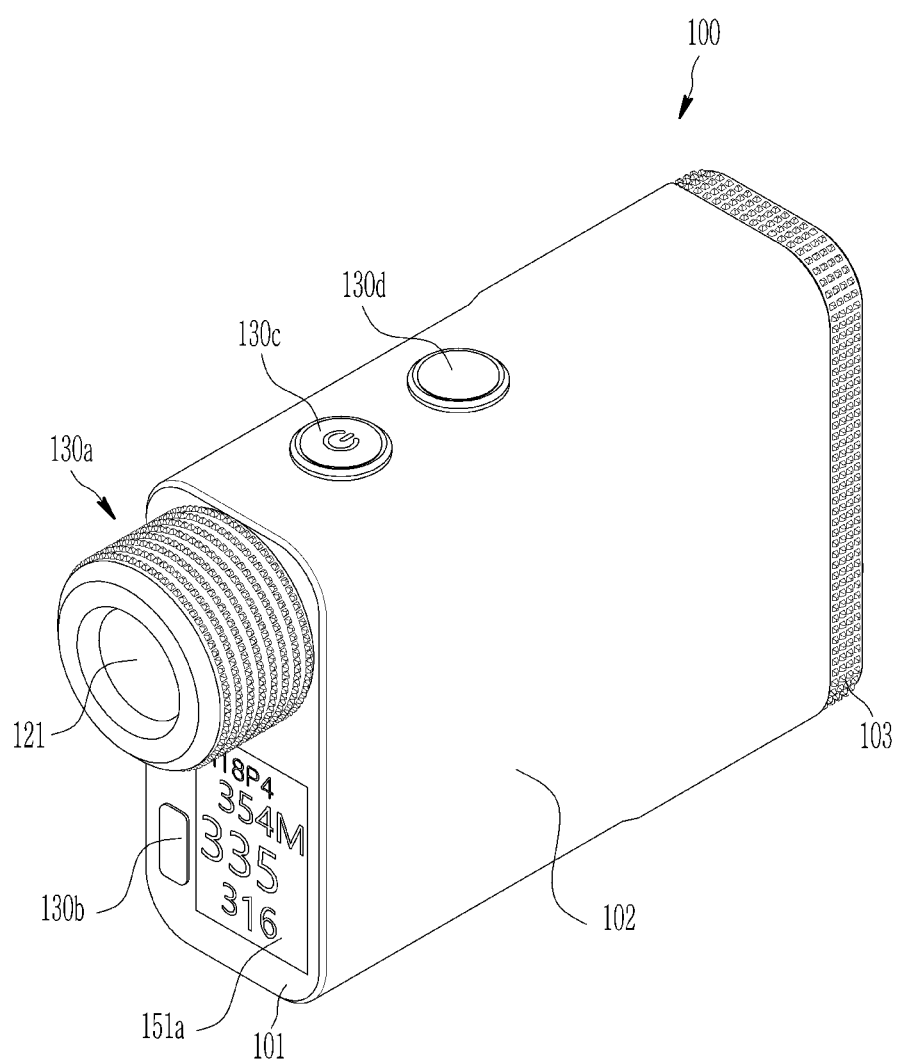
FIG. 2 and FIG. 3 are schematic views of an example of the distance measurement device according to the exemplary embodiment, viewed from different directions.
Figure 3:
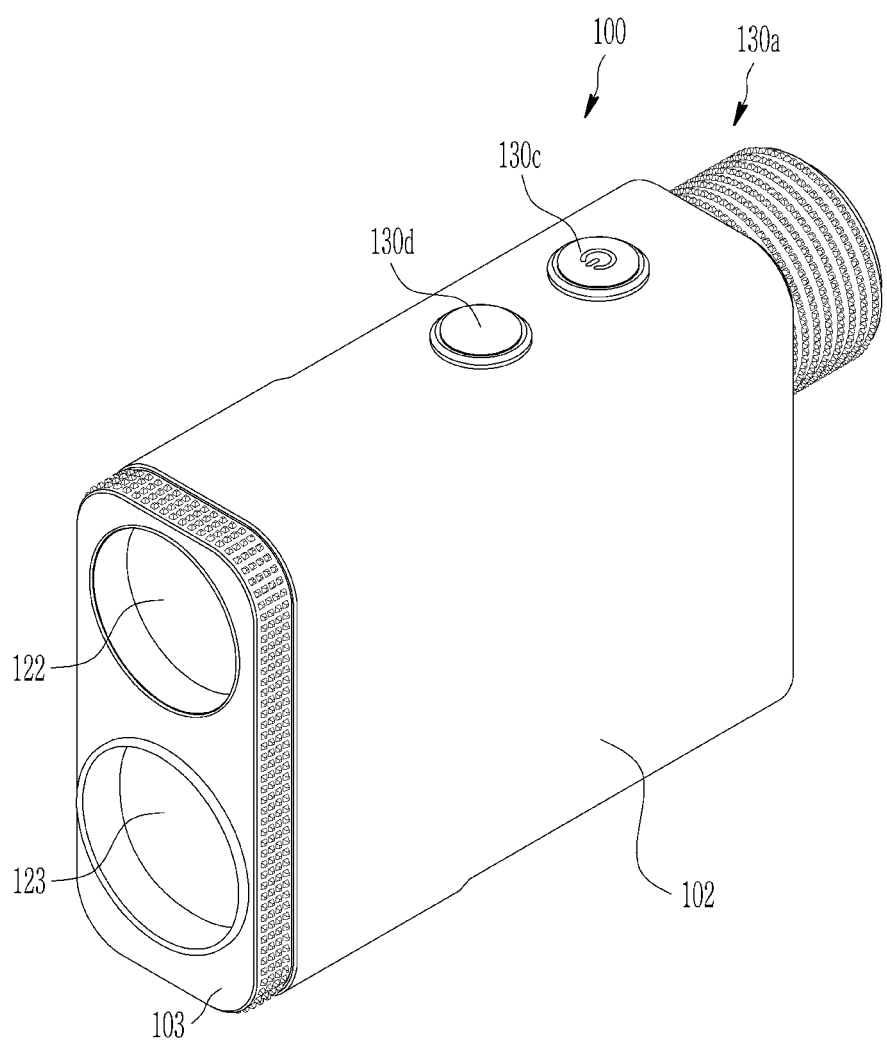

FIG. 1 is a block diagram provided for description of a distance measurement device according to an exemplary embodiment, and FIG. 2 and FIG. 3 are schematic views of an example of the distance measurement device according to the exemplary embodiment, viewed from different directions.

A distance measurement device 100 may include a sensing portion 110, an optical portion 120, a user input portion 130, an interface portion 140, an output portion 150, a memory 160, a wireless communication portion 170, a control portion 180, and a power supply portion 190. Since the constituent elements shown in FIG. 1 are not essential for implementing the distance measurement device 100, the distance measurement device 100 described in this specification may have more or fewer constituent elements than the constituent elements listed above.

More specifically, the sensing portion 110 may include one or more sensors for sensing at least one of surrounding environment information of the distance measurement device 100 and information in the distance measurement device 100. For example, the sensing portion 110 may include at least one of a distance measurement sensor 111, a location acquisition sensor 112, an acceleration sensor 113, an azimuth sensor 114, a gyroscope sensor, a battery gauge, and an environmental sensor (e.g., a barometer, a hygrometer, a thermometer, and the like). Meanwhile, the distance measurement device 100 disclosed in the present specification may utilize information by combining information sensed from at least two or more sensors among the above-stated sensors.

First, the distance measurement sensor 111 refers to a sensor that measures a distance to a target. The distance measurement sensor 111 may include an ultrasonic wave sensor, an infrared (IR) sensor, a laser sensor, a radio detecting and ranging sensor, an optical sensor (e.g., a camera), and the like. The types of the distance measurement sensor 111 are not limited to the above-listed types of sensors, and include all kinds of sensors that measure a distance to a target.

In the following description, it is assumed that the distance measurement sensor 111 is a laser sensor that transmits a laser frontward and receives a laser reflected by the target to measure a distance to the target.

The location acquisition sensor 112 is a sensor for acquiring a location of the distance measurement device 100, and a global positioning system (GPS) sensor is a representative example. The GPS sensor calculates distance information and accurate time information from three or more satellites, and applies trigonometry to the calculated information to thereby calculate accurate current location information in three dimensions according to a latitude, a longitude, and an altitude. Currently, a method of calculating location and time information using three satellites and correcting an error of the calculated location and time information using another satellite is widely used. In addition, the GPS sensor can calculate speed information by continuously calculating a current location in real time.

The acceleration sensor 113 can acquire the degree of tilt of the distance measurement device 100. The acceleration sensor 113 may include an accelerometer that measures acceleration due to gravity. The acceleration sensor 113 may also be implemented by calculating the degree of tilt by using a rotation angle in the vertical direction from a predetermined reference direction, acquired by the gyroscope sensor.

The azimuth sensor 114 measures an azimuth angle, and may acquire a value of an azimuth angle at which the distance measurement device 100 faces. The azimuth sensor 114 may be a geomagnetic sensor that measures an azimuth by sensing a magnetic field on Earth. In addition, the azimuth sensor 114 may be implemented by calculating an azimuth angle using a rotation angle in a vertical direction from a predetermined reference direction obtained by the gyroscope sensor.

The optical portion 120 has a structure for receiving light, and may include a lens portion and a filter portion. The optical portion 120 optically processes light from a subject.

The lens portion may include a zoom lens and a compensate lens, and the filter portion may include an ultraviolet filter and an optical low pass filter.

Next, the user input portion 130 is provided for receiving information from a user, and when information is input through the user input portion 130, the user input portion 130 may control operation of the distance measurement device 100 to correspond to the input information. Such a user input portion 130 may include a mechanical input means (or a mechanical key, e.g., a button located at a front side, a rear side, or a side surface of the distance measurement device 100, a dome switch, a jog wheel, a jog switch, and the like) and a touch-type input means. As an example, the touch-type input means may be formed of a virtual key, a soft key, or a visual key displayed on a touch screen through software processing, or a touch key disposed on other than the touch screen. The virtual key or the visual key may be displayed on the touch screen while having various forms, for example, graphics, texts, icons, videos, or a combination thereof.

The interface portion 140 serves to provide a path with various types of external devices connected to the distance measurement device 100. The interface portion 140 may include at least one of an external charger port, a wireless/wired data port, and a memory 160 card. The distance measurement device 100 may carry out proper control related to the external device connected thereto, corresponding to the connection of the external device to the interface portion 140.

The output portion 150 generates an output related to visual, auditory, or tactile senses, and may include a display portion 151, an acoustic output portion 152, a vibration output portion 153, and the like.

The display portion 151 outputs information processed by the distance measurement device 100. For example, the display portion 151 may output information of an execution screen of an application program executed in the distance measurement device 100, or user interface (UI) and graphical user interface (GUI) information according to the execution screen information.

The display portion 151 may include at least one of a liquid crystal display (LCD), a thin film transistor-liquid crystal display (TFT LCD), an organic light-emitting diode (OLED) display, and an electronic-ink display (e-ink display).

In addition, the display portion 151 may include two or more thereof according to an implementation form of the distance measurement device 100. In this case, the plurality of display portions 151 may be arranged at an outer surface or inside of the distance measurement device 100, or they may be individually arranged at the outer surface and the inside of the distance measurement device 100, respectively.

A display portion 151a disposed at the outer surface may include a touch sensor that senses a touch with respect to the display portion 151a such that a control instruction can be input by a touch method. When a touch is made to the display portion 151a, the touch sensor may sense the touch, and the control portion 180 may generate a control instruction corresponding to the touch based on the touch sensor. The content input by the touch method may be a letter or a number, or a menu item that can be indicated or designated in various modes.

A display portion 151b disposed inside the distance measurement device 10 may display an image to a user through eyepieces 121. The display portion 151b disposed inside the distance measurement device 100 includes a transparent display (or a translucent display) that is directly located on an optical path of the eyepieces 121. A transparent OLED display is a representative example of the transparent display. In addition, the display portion 151b disposed inside the distance measurement device 10 may be an opaque display that provides an image on the optical path of the eyepieces 121 through an optical member having a function such as light refraction or reflection.

The sound output portion 152 may output audio data stored in the memory 160 as a sound, and may be implemented in the form of a loudspeaker that outputs various alarm sounds or multimedia playback sounds.

The vibration output portion 153 generates various tactile effects that a user can feel. The strength, patterns, and the like of vibration generated by the vibration output portion 153 may be controlled by user's selection or setting of the control portion 180. For example, the vibration output portion 153 may synthesize and output different vibrations or output them sequentially.

In addition, the output portion 150 may further include a light output portion that outputs a signal indicating an event occurrence by using a light source.

Further, the memory 160 stores data (e.g., the data includes course map data with respect to a tee box, a fairway, a hazard, a bunker, a rough, a green, and a hole of a golf course, but this is not restrictive) that support various functions of the distance measurement device 100. The memory 160 may store firmware and application programs driven by the distance measurement device 100, and data and instructions for operation of the distance measurement device 100. At least a part of the application programs may be installed in the distance measurement device 100 when being released for basic functions of the distance measurement device 100. In addition, at least a part of the application program may be downloaded from an external server through wireless communication. Meanwhile, the application program may be stored in the memory 160 and installed in the distance measurement device 100 such that is may be driven to perform an operation (or a function) of the distance measurement device 100.

The wireless communication portion 170 may include one or more modules that enable wireless communication between the distance measurement device 100 and a wireless communication system, between the distance measurement device 100 and other devices capable of wireless communication, or between the distance measurement device 100 and an external server.

Such a wireless communication portion 170 may include a wireless Internet module 171 and a short-range communication module 172.

The wireless Internet module 171 refers to a module for wireless Internet access, and may be embedded in the distance measurement device 100. The wireless Internet module 171 is formed to transmit and receive a wireless signal in a communication network according to wireless Internet technologies. The wireless Internet technologies, for example, include wireless LAN (WLAN), wireless-fidelity (Wi-Fi), Wi-Fi direct, digital living network alliance (DLNA), wireless broadband (WiBro), world interoperability for microwave access (WiMAX), high-speed downlink packet access (HSDP), high-speed uplink packet access (HSUPA), long term evolution (LTE), long term evolution-advanced (LTE-A), and the like, and the wireless Internet module 171 transmits/receives data according to at least one wireless Internet technology in a range including Internet technologies not listed above.

The short-range communication module 172 is for short-range communication, and may support short range communication by using at least one of Bluetooth™, radio frequency identification (RFID), infrared data association (IrDA), ultra wideband (UWB), ZigBee, near field communication (NFC), Wi-Fi, Wi-Fi Direct, and wireless universal serial bus (USB). Such a short-range communication module 172 may support wireless communication between the distance measurement device 100 and a wireless communication system, between the distance measurement device 100 and a device capable of wireless communication, or between the distance measurement device 100 and a network where an external server is located through wireless area networks. The wireless area networks may be wireless personal area networks.

Here, the wireless communication capable device is a wearable device (e.g., a smart watch, smart glasses, and the like) capable of exchanging (or interworking) data with the distance measurement device 100 according to the present invention. The short-range communication module 172 may detect (or recognize) a wearable device that can communicate with the distance measurement device 100 at the periphery of the distance measurement device 100. Further, when the sensed wearable device is a device that is authorized for communication with the distance measurement device 100 according to the exemplary embodiment, the control portion 180 may transmit at least a part of data processed by the distance measurement device 100 to the wearable device through the short-range communication module 172. Thus, a user of the wearable device can use data processed by the distance measurement device 100 through the wearable device.

In addition to the operation related to the application program, the control portion 180 typically controls the overall operation of the distance measurement device 100. The control portion 180 may provide or process information or a function appropriate to a user by processing signals, data, information, and the like, which are input or output through the above-described components, or by driving an application program stored in the memory 160.

In addition, the control portion 180 may control at least a part of the above-described constituent elements shown in FIG. 1 for driving of the application programs stored in the memory 160. In addition, the control portion 180 may operate at least two or more of the components included in the distance measuring device 100 in combination with each other to drive the application program.

The power supply portion 190 receives external power and internal power under control of the control portion 180, and supplies power to the respective constituent elements included in the distance measurement device 100. Such a power supply portion 190 includes a battery, which may be an internal battery or a replaceable battery.

At least some of the above-stated constituent elements may operate in cooperation with each other to implement an operation, control, or a control method of the distance measurement device 100 according to various embodiments described below. In addition, the operation, the control, or the control method of the distance measurement device 100 may be implemented in the distance measurement device 100 by driving at least one of the application programs stored in the memory 160.

Referring to FIG. 2 and FIG. 3, the disclosed distance measurement device 100 includes a pillar-shaped body having an oval track shape in front and rear surfaces. However, the present invention is not limited thereto, and may be applied to various structures such as a watch type, a clip type, a glasses type, a slide type, a swing type, and a swivel type, each in which two or more bodies are coupled to be movable relative to each other. Although it will be related to a particular type of the distance measurement device 100, a description of a particular type of the distance measurement device 100 may be generally applied to other types of the distance measurement device 100.

Here, the body may be understood as a concept that refers to the distance measurement device 100 as at least one assembly.

The distance measurement device 100 includes a case (e.g., a frame, a housing, a cover, and the like) that forms an external appearance. As illustrated in the drawing, the distance measurement device 100 may include a front case 101, a middle case 102, and a rear case 103. Various electronic parts are disposed in an internal space that is formed by combination of the front case 101, the middle case 102, and the rear case 103.

These cases may be formed by molding a synthetic resin, or may be formed of a metal such as stainless steel (STS), aluminum (Al), titanium (Ti), and the like, and the outer side of the case may be covered by a material such as leather, rubber, and the like.

The eyepieces lens 121, a first operation unit 130a, a second operation unit 130b, and the display portion 151a may be disposed in the front case 101. In this case, the first operation unit 130a may be disposed in the form of a jog wheel around the eyepieces lens 121, thereby protecting the eyepiece lens 121

A third operation unit 130c and a fourth operation unit 130d may be disposed in one side of the middle case 102. A user may conveniently manipulate the third operation unit 130c and the fourth operation unit 130d while holding the distance measurement device 100.

At least one of object lenses 122 and 123 may be disposed in the rear case 103. The object lenses 122 and 123 may receive light from the outside. For example, the object lens 122 disposed at the upper side receives light from an object such that the user can visually identify the object through the eyepiece lenses 121. The object lens 123 disposed at the lower side may receive a reflected laser when the laser emitted from the distance measurement device 100 is reflected by the target.

These configurations are not limited to this disposition. These configurations may be excluded or replaced as needed, or disposed on other sides. For example, the display portion 151a and the second operation unit 130b may not be disposed in the front side of the body, and the number of operation units 130a, 130b, 130c, and 130d can be changed.

Next, referring to FIG. 4, the optical portion 120 and the distance measurement sensor 111 of the distance measurement device 100 will be described in detail.

Figure 4:
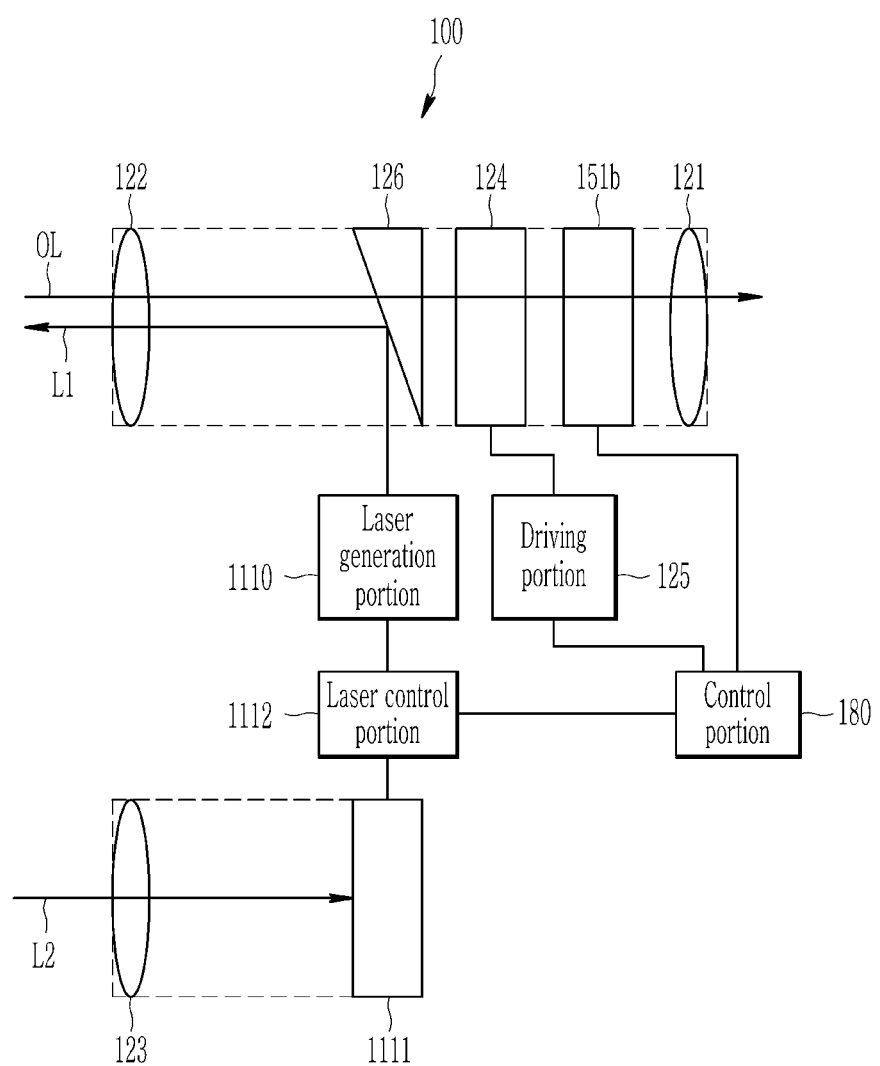
FIG. 4 shows a schematic structure of the optical portion and the distance measurement sensor of the distance measurement device according to the exemplary embodiment.

FIG. 4 shows a schematic structure of the optical portion 120 and the distance measurement sensor 111 of the distance measurement device 100 according to the exemplary embodiment.

The distance measurement device 100 according to the exemplary embodiment includes two object lenses 122 and 123, one eyepiece lens 121, a a light path changing portion 126, a light processing portion 124, a display portion 151, a laser generation portion 1110, a laser receiving portion 1111, a laser control portion 1112, and a control portion 180.

External light OL may be incident on the distance measurement device 100 through the first object lens 122, or a laser L1 generated by the laser generation portion 1110 may be emitted to the outside. A path may be changed such that the laser generated by the laser generation portion 1110 may move toward the first object lens 122 through the light path changing portion 126.

The external light OL is incident on the light processing portion 124 through the first object lens 122 and the light path changing portion 126. The light processing portion 124 includes a lens portion and a filter portion. The external light OL incident on the light processing portion 124 is optically processed and then directed toward the eyepiece lens 121. The lens portion processes light according to driving of a driving portion 125. For example, when the user manipulates the first operation unit 130a and the like, the driving portion 125 is driven such that a zoom lens moves to carry out zooming-in or zooming-out.

A laser L2 reflected by the target may be incident on the distance measurement device 100 through the second object lens 123. The laser receiving portion 1111 may receive the laser L2 incident thereon through the second object lens 124, and outputs a corresponding signal to the control portion 1112.

Then, the laser control portion 1112 may calculate a distance from the distance measurement device 100 to the target by using a signal received from the laser receiving portion 1111. The calculated distance value is output to the control portion 180.

The display portion 151b is formed of a transparent or translucent display and thus may be directly disposed on a path through which the external light OL passes. Alternatively, the display portion 151b may provide an image to the light path of the eyepiece lens 121 through an optical member having a function such as light refraction or reflection.

Hereinafter, exemplary embodiments related to a control method that can be implemented in the distance measurement device 100 configured as described above will be described with reference to the accompanying drawings. It is obvious to a person of ordinary skill in the art that the present invention can be embodied in other specific forms in a range that does not deviate from the spirit and essential features of the present invention.

Figure 5:
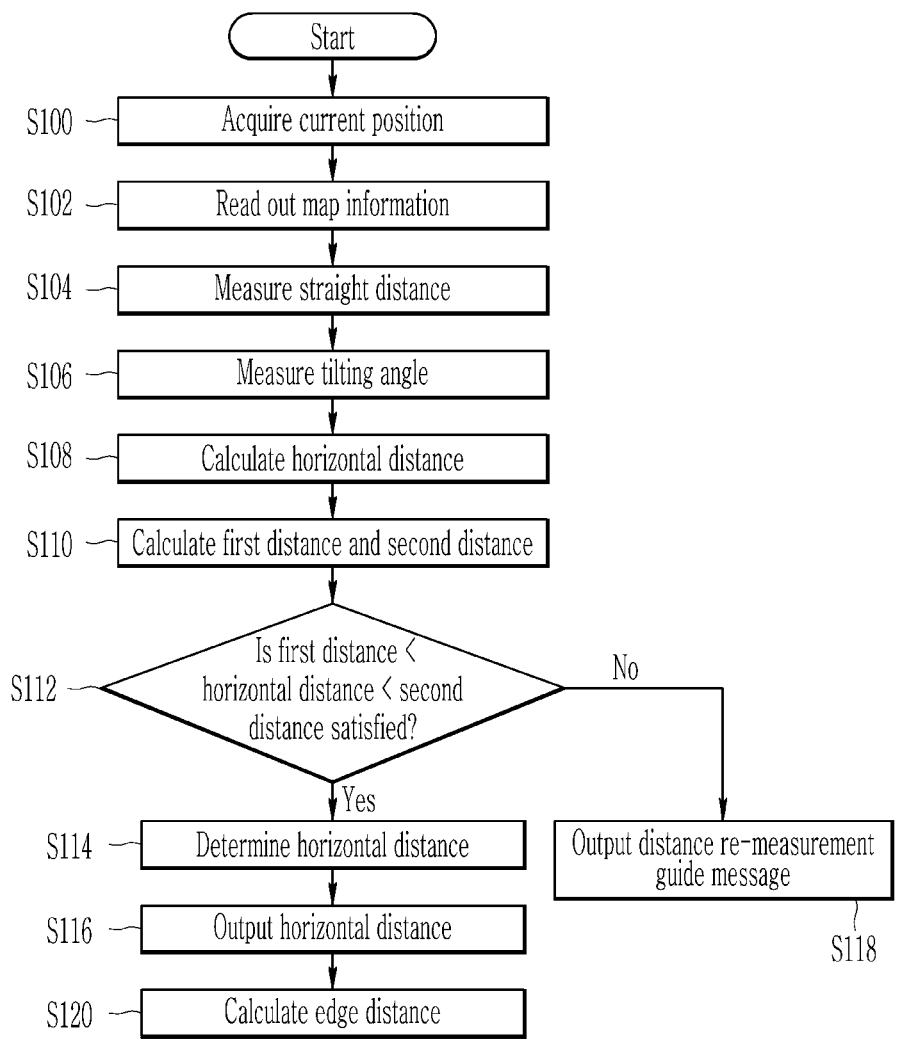
FIG. 5 shows a flowchart of a control method of the distance measurement device 100 according to an exemplary embodiment.
Figure 6:
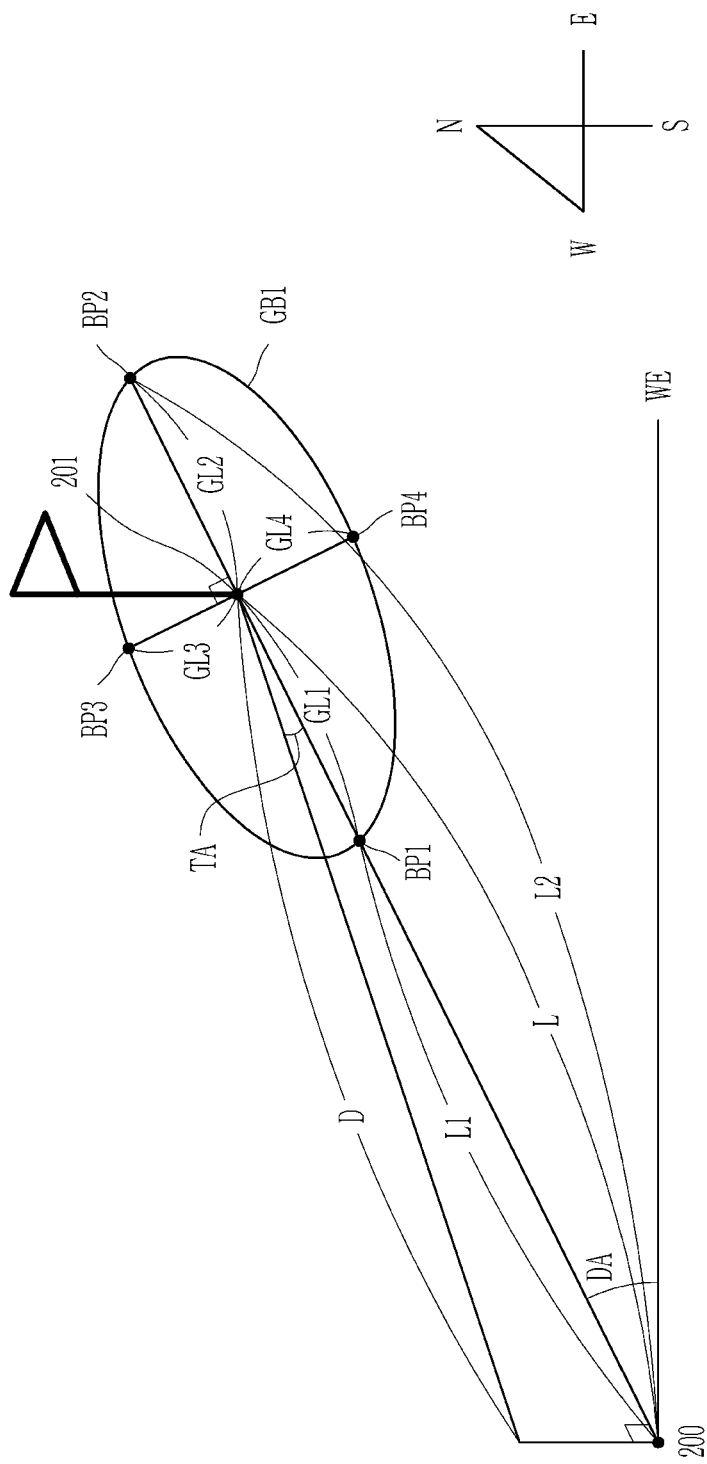
FIG. 6 shows an example of calculation of distance information according to the control method of FIG. 5.

Referring to FIG. 5 and FIG. 6, a control method of the distance measurement device 100 according to an exemplary embodiment will be described.

FIG. 5 is a flowchart of a control method of the distance measurement device according to an exemplary embodiment, and FIG. 6 shows an example of calculation of distance information according to the control method of FIG. 5.

First, the location acquisition sensor 112 acquires coordinates of a current location 200 (S100). The location acquisition sensor 112 may acquire the coordinates of a current location 200 of the distance measurement device 100.

The control portion 180 reads out course map information corresponding to the coordinates of the current location 200 from the memory (S102). The course map information includes location coordinates that indicate a green boundary GB of the golf course including the coordinates of the current location 200.

The distance measurement sensor 111 measures a straight distance to a target 201 from the distance measurement device 100 (S104), and measures an angle (hereinafter referred to as a tilt angle) at which the distance measurement device 100 tilts toward the target 201 (S106).

Then, the control portion 180 calculates a horizontal distance from the distance measurement device 100 to the target 201 according to Equation 1 by using the measured straight distance and tilt angle (S108).

$$L = D \times \cos TA \qquad \text{(Equation 1)}$$

In Equation 1, L denotes a horizontal distance from the distance measurement device 100 to a target, D denotes a straight distance measured by the distance measurement sensor 111, and TA denotes a tilt angle.

The control portion 180 generates a boundary GB1 that indicates a green boundary by using location coordinates that respectively indicate green boundaries, and calculates a first distance L1 and a second distance L2 based on the coordinates of the current location 200, the horizontal distance L, and the boundary GB1 (S110).

Figure 7:
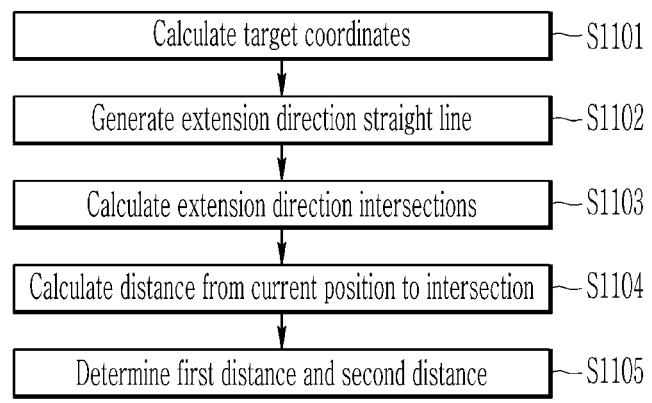
FIG. 7 is a flowchart for calculating the first distance and the second distance according to the exemplary embodiment.

FIG. 7 is a flowchart for calculating the first distance and the second distance according to the exemplary embodiment.

First, the control portion 180 may calculate coordinates of the target 201 based on the coordinates of the current location 200 by using the horizontal distance L and an azimuth at which the distance measurement device 100 faces (S1101). For example, as shown in FIG. 6, an east direction distance and a north direction distance to the target 201 from the current location 200 are calculated by using an azimuth DA and the horizontal direction L, and coordinates of the target 201 can be calculated by adding the east direction distance and the north direction distance to the coordinates of the current location 200. In FIG. 6, the azimuth DA may be an azimuth of a straight line L when a reference line WE is referred to.

Next, the control portion 180 generates an extension direction straight line that connects the boundary GB1, the coordinates of the current location 200, and the coordinates of the target 201 (S1102). The control portion 180 calculates at least two intersections BP1 and BP2 at which the extension direction straight line and the boundary GB1 meet each other (S1103).

The control portion 180 calculates a distance from the current location 200 to the at least two intersections BP1 and BP2, respectively (S1104).

The control portion 180 may determine the shortest distance among the calculated distances as a first distance L1 and the longest distance as a second distance L2 (S1105).

The control portion 180 determines whether the calculated horizontal distance L is longer than the first distance L1 and shorter than the second distance L2 (S112).

When the calculated horizontal distance L is longer than the first distance L1 and shorter than the second distance L2, the control portion 180 determines the horizontal distance L as a horizontal distance from the current location 200 to the target 201 (S114).

The control portion 180 may calculate a distance from the position of the target 201 determined by a pin to an edge in each of the extension direction and the orthogonal direction (S120). The extension direction may be a direction connecting the current location 200 and the target 201, and the orthogonal direction may be a direction orthogonal to the extension direction.

Figure 8:
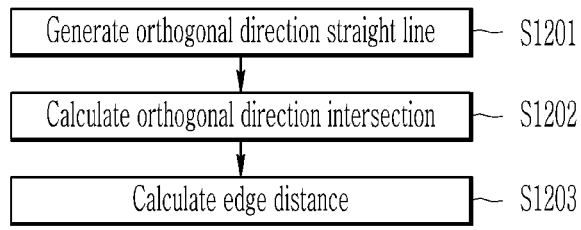
FIG. 8 is a flowchart of a method for calculating a distance to the edge according to the exemplary embodiment.

FIG. 8 is a flowchart of a method for calculating a distance to the edge according to the exemplary embodiment.

The control portion 180 generates a straight line in an orthogonal direction that passes through a target 201 in an orthogonal direction of the target 201 (S1201).

The control portion 180 calculates two intersections BP3 and BP4 between the boundary line GB1 and the orthogonal direction straight line (S1202). The control portion 180 calculates edge distances GL1 and GL2 between the intersection BP1 and BP2 and the target 201 and edge distances GL3 and GL4 between the intersection BP3 and BP4 corresponding to the first distance and the second distance determined in step S1105 and the target 201, respectively (S1203).

The control portion 180 may output the edge distances GL1 to GL4 together with the corresponding horizontal distance L by using the output portion 150.

For example, the control portion 180 may display a value of the horizontal distance HL and the edge distances GL1 to GL4 on the display portion 151 or output as sound by using the acoustic output portion 152. In addition, the control portion 180 may output a vibration indicating that a pin exists at the horizontal distance L measured using the vibration output portion 153.

The control portion 180 outputs a message that guides distance re-measurement by using output portion 150 when the calculated horizontal distance L is shorter than the first distance L1 or longer than the second distance L2.

For example, the control portion 180 may display a re-measurement guide message on the display portion 151, or may output the re-measurement guide message as a sound by using the acoustic output portion 152. In addition, the control portion 180 may output a vibration of a sequence that guides re-measurement by using the vibration output portion 153.

According to the control method of the distance measurement device 100 as described above, there is a merit that the user can easily check the position of the hole and the distance from the current location to the hole. In particular, the user can accurately recognize the location of the hole on the green, resulting in a more accurate shot.

Although the exemplary embodiment has been implemented in the distance measurement device, the present invention is not limited thereto, and may be implemented in various smart devices capable of implementing an application.

Hereinafter, a smart device to which the exemplary embodiment of the present invention is applied will be described.

Figure 9:
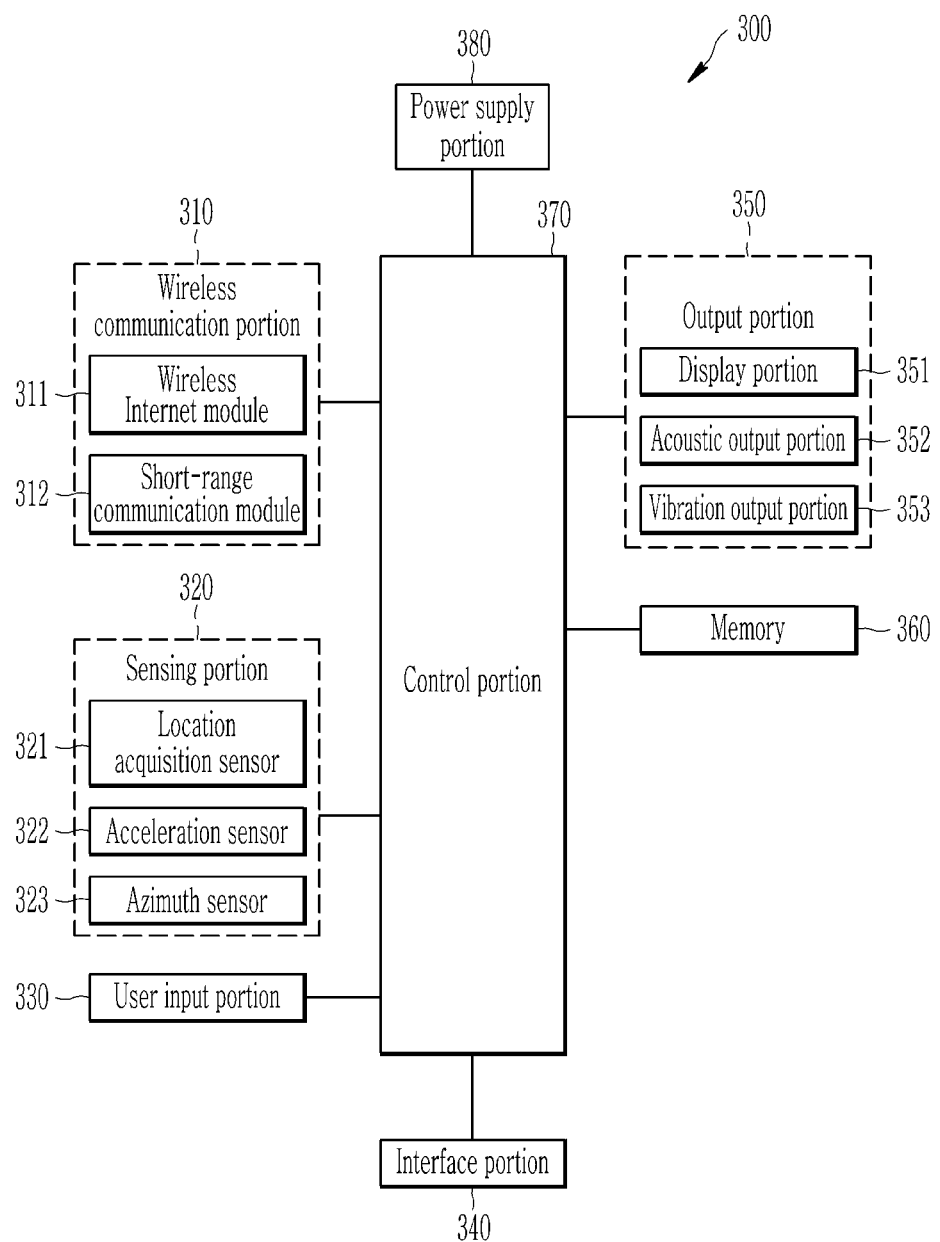
FIG. 9 is a block diagram for description of a smart device to which the exemplary embodiment is applied.
Figure 10:
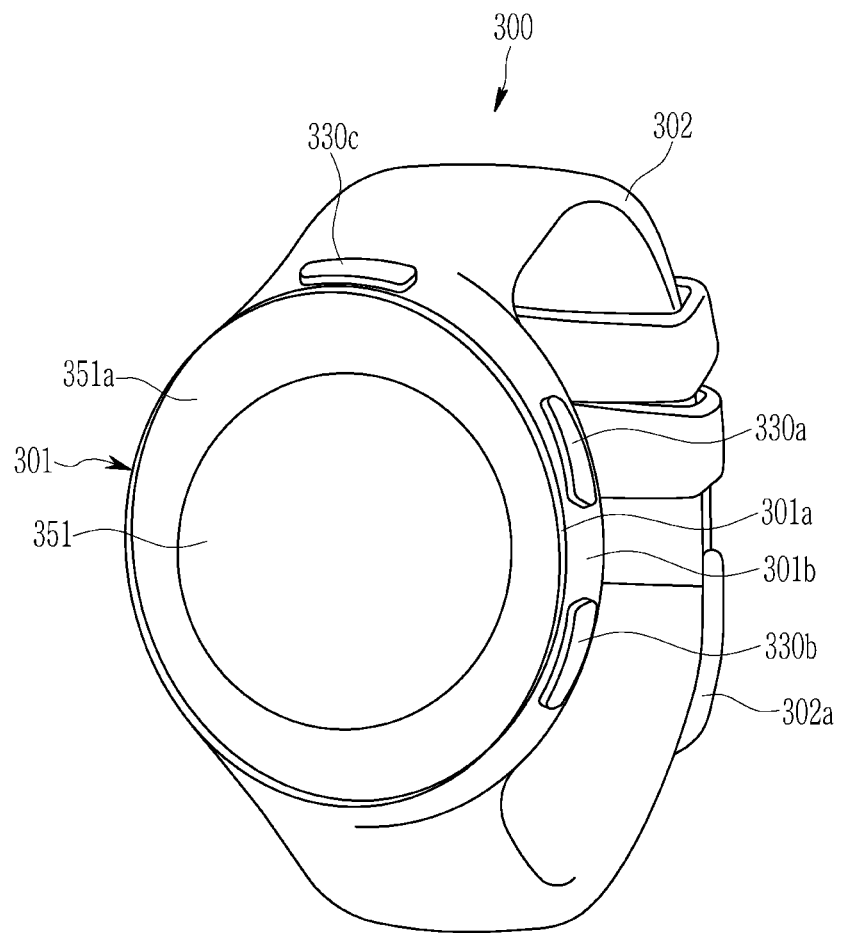
FIG. 10 is a schematic view of the smart device associated with the exemplary embodiment.

FIG. 9 is a block diagram for description of a smart device to which the exemplary embodiment is applied, and FIG. 10 is a schematic view of the smart device associated with the exemplary embodiment.

A smart device 300 may include a wireless communication portion 310, a sensing portion 320, a user input portion 330, an interface portion 340, an output portion 350, a memory 360, a control portion 370, and a power supply portion 380. The constituent elements shown in FIG. 9 are not essential for implementing the smart device 300, so the smart device 300 described in this specification may have more or fewer constituent elements than the constituent elements listed above.

More specifically, among the above-listed constituent elements, the wireless communication portion 310 may include one or more modules that enable wireless communication between the smart device 300 and a wireless communication system, between the smart device 300 and other devices capable of wireless communication, or between the smart device 300 and an external server.

Such a wireless communication portion 310 may include a wireless Internet module 311 and a short-range communication module 312.

The wireless Internet module 31 refers to a module for wireless Internet access, and may be embedded in the smart device 300. The wireless Internet module 311 is formed to transmit and receive a wireless signal in a communication network according to wireless Internet technologies. The wireless Internet technologies, for example, include wireless LAN (WLAN), wireless-fidelity (Wi-Fi), Wi-Fi direct, digital living network alliance (DLNA), wireless broadband (WiBro), world interoperability for microwave access (WiMAX), high-speed downlink packet access (HSDP), high-speed uplink packet access (HSUPA), long term evolution (LTE), long term evolution-advanced (LTE-A), and the like, and the wireless Internet module 171 transmits/receives data according to at least one wireless Internet technology in a range including Internet technologies not listed above.

The short-range communication module 312 is for short-range communication, and may support short range communication by using at least one of Bluetooth™, radio frequency identification (RFID), infrared data association (IrDA), ultra wideband (UWB), ZigBee, near field communication (NFC), Wi-Fi, Wi-Fi Direct, and wireless universal serial bus (USB). Such a short-range communication module 312 may support wireless communication between the smart device 300 and a wireless communication system, between the smart device 300 and a device capable of wireless communication, or between the smart device 300 and a network where an external server is located through wireless area networks. The wireless area networks may be wireless personal area networks.

Here, the wireless communication capable device is a wearable device (e.g., a smart watch, smart glasses, and the like) capable of exchanging (or interworking) data with the smart device 300 according to the present invention. The short-range communication module 312 may detect (or recognize) a wireless communication capable device that can communicate with the smart device 300 at the periphery of the smart device 300. Further, when the sensed wireless communication capable device is a device that is authorized for communication with the smart device 300 according to the exemplary embodiment, the control portion 370 may transmit at least a part of data processed by the smart device 300 to the wireless communication capable device through the short-range communication module 312. Thus, a user of the wireless communication capable device can use data processed by the smart device 300 through the wireless communication capable device.

The sensing portion 320 may include one or more sensors for sensing at least one of surrounding environment information of the smart device 300 and information in the smart device 300. For example, the sensing portion 320 may include at least one of a location acquisition sensor 321, an acceleration sensor 322, an azimuth sensor 323, a gyroscope sensor, a battery gauge, and an environmental sensor (e.g., a barometer, a hygrometer, a thermometer, and the like). Meanwhile, the smart device 300 disclosed in the present specification may utilize information by combining information sensed from at least two or more sensors among the above-stated sensors.

The location acquisition sensor 321 is a sensor for acquiring a location of the smart device 300, and a global positioning system (GPS) sensor is a representative example. The GPS sensor calculates distance information and accurate time information from three or more satellites, and applies trigonometry to the calculated information to thereby calculate accurate current location information in three dimensions according to a latitude, a longitude, and an altitude. Currently, a method of calculating location and time information using three satellites and correcting an error of the calculated location and time information using another satellite is widely used. In addition, the GPS sensor can calculate speed information by continuously calculating a current location in real time.

The acceleration sensor 322 can acquire the degree of tilt of the smart device 300. The acceleration sensor 322 may include an accelerometer that measures acceleration due to gravity. The acceleration sensor 322 may also be implemented by calculating the degree of tilt by using a rotation angle in the vertical direction from a predetermined reference direction, acquired by the gyroscope sensor.

The azimuth sensor 323 is a sensor that measures an azimuth angle, and may acquire a value of an azimuth angle at which the smart device 300 faces. The azimuth sensor 323 may be a geomagnetic sensor that measures an azimuth by sensing a magnetic field on Earth. In addition, the azimuth sensor 323 may be implemented by calculating an azimuth angle using a rotation angle in a vertical direction from a predetermined reference direction obtained by the gyroscope sensor.

Next, the user input portion 330 is provided for receiving information from a user, and when information is input through the user input portion 330, the user input portion 330 may control operation of the distance measurement device 100 to correspond to the input information. Such a user input portion 330 may include a mechanical input means (or a mechanical key, e.g., a button located at a front side, a rear side, or a side surface of the distance measurement device 100, a dome switch, a jog wheel, a jog switch, and the like) and a touch-type input means. As an example, the touch-type input means may be formed of a virtual key, a soft key, or a visual key displayed on a touch screen through software processing, or a touch key disposed on other than the touch screen. The virtual key or the visual key may be displayed on the touch screen while having various forms, for example, graphics, texts, icons, videos, or a combination thereof.

The interface portion 340 servers to provide a path with various types of external devices connected to the smart device 300. Such an interface portion 340 may include at least one of an external charger port, a wireless/wired data port, and a memory 360 card. The smart device 300 may carry out proper control related to the external device connected thereto corresponding to the connection of the external device to the interface portion 340.

The output portion 350 generates an output related to visual, auditory, or tactile senses, and may include a display portion 351, an acoustic output portion 352, a vibration output portion 353, and the like.

The display portion 351 outputs information processed by the smart device 300. For example, the display portion 351 may output information of an execution screen of an application program executed in the smart device 300, or user interface (UI) and graphical user interface (GUI) information according to the execution screen information. Two or more display portions 351 may exist depending on an implementation form of the smart device 300.

The display portion 351 may include at least one of a liquid crystal display (LCD), a thin film transistor-liquid crystal display (TFT LCD), an organic light-emitting diode (OLED) display, and an electronic-ink display (e-ink display).

The acoustic output portion 352 may output audio data stored in the memory 360 as a sound, and may be implemented as a loudspeaker that outputs various alarm sounds or playback sounds of multimedia.

The vibration output portion 353 generates various tactile effects that a user can feel. The strength, patterns, and the like of vibration generated by the vibration output portion 353 may be controlled by user's selection or setting of the control portion 370. For example, the vibration output portion 353 may synthesize and output different vibrations or output them sequentially.

In addition to that, the output portion 350 may further include a light output portion that outputs a signal indicating an event occurrence by using a light source.

Further, the memory 360 stores data (e.g., the data includes course map data with respect to a tee box, a fairway, hazard, a bunker, a rough, a green, and a hole of a golf course, but this is not restrictive) that supports various functions of the smart device 300. The memory 360 may store firmware and application programs driven by the smart device 300, and data and instructions for operation of the smart device 300. At least a part of the application programs may be installed in the smart device 300 when being released for basic functions of the smart device 300. In addition, at least a part of the application program may be downloaded from an external server through wireless communication. Meanwhile, the application program may be stored in the memory 360 and installed in the smart device 300 such that is may be driven to perform an operation (or a function) of the smart device 300.

In addition to the operation related to the application program, the control portion 370 typically controls the overall operation of the smart device 300. The control portion 370 may provide or process information or a function appropriate to a user by processing signals, data, information, and the like, which are input or output through the above-described components, or by driving an application program stored in the memory 360.

In addition, the control portion 370 may control at least a part of the above-described constituent elements shown in FIG. 9 for driving of the application programs stored in the memory 360. Further, the control portion 370 may operate at least two or more of the components included in the smart device 300 in combination with each other to drive the application program.

The power supply portion 380 receives external power and internal power under control of the control portion 370, and supplies power to the respective constituent elements included in the smart device 300. Such a power supply portion 380 includes a battery, which may be an internal battery or a replaceable battery.

At least some of the above-stated constituent elements may operate in cooperation with each other to implement an operation, control, or a control method of the smart device 300 according to various embodiments described below. In addition, the operation, the control, or the control method of the smart device 300 may be implemented in the smart device 300 by driving at least one of the application programs stored in the memory 360.

The smart device 300 may be applied to various structures such as a watch type, a clip type, a glasses type, a slide type, a swing type, and a swivel type, each in which two or more bodies are coupled to be movable relative to each other. Although it will be related to a particular type of the smart device 300, a description of a particular type of the smart device 300 may be generally applied to other types of the smart device 300.

Referring to FIG. 10, the smart device 300 includes a main body 301 that includes the display portion 351, and a band 302 that is connected to the main body 301 and can be worn on a wrist.

The main body 301 includes a case that forms an external appearance. As shown in the drawing, the case may include a first case 301a and a second case 301b that provide an interior space for accommodating various electronic components. However, the present invention is not limited thereto, and one case may be provided to form the internal space such that a smart device 300 having a unibody may be implemented.

The smart device 300 is configured to enable wireless communication, and an antenna for the wireless communication may be installed in the main body 301. On the other hand, the antenna can have its performance extended by using a case. For example, a case that includes a conductive material may be configured to be electrically connected to the antenna to extend the ground area or a radiation area.

The display portion 351 is disposed on the front of the main body 301 to output information. As shown in the drawing, a window 351a of the display portion 351 may be mounted on the first case 301a to form the front surface of a terminal body together with the first case 301a.

In addition, a touch sensor is provided in the display portion 351 such that the display portion 351 is implemented as a touch screen. Hereinafter, it is assumed that the display portion 351 is a touch screen.

The main body 301 may be provided with user input portions 330a, 330b, and 330c, an acoustic output portion (not shown), a microphone (not shown), and the like. When the display portion 351 is implemented as a touch screen, the display portion 351 may function as a user input portion 330, and accordingly, a separate key may not be provided in the main body 301.

The band 302 is worn on the wrist to surround the wrist, and may be formed of a flexible material to facilitate wearing. As such an example, the band 302 may be formed of leather, rubber, silicone, a synthetic resin material, or the like. In addition, the band 302 is configured to be detachably attached to the main body 301, and the user can replace it with various types of bands according to the user preferences.

On the other hand, the band 302 can be used to extend the performance of the antenna. For example, the band may have a ground extension (not shown) that is electrically connected to the antenna to extend the ground area.

The band 302 may be provided with a fastener 302a. The fastener 302a may be implemented by a buckle, a snap-fit hook structure, Velcro (trade name), or the like, and may include a section or a material having elasticity. In this drawing, an example of the fastener 302a in the form of a buckle is shown.

Figure 11:
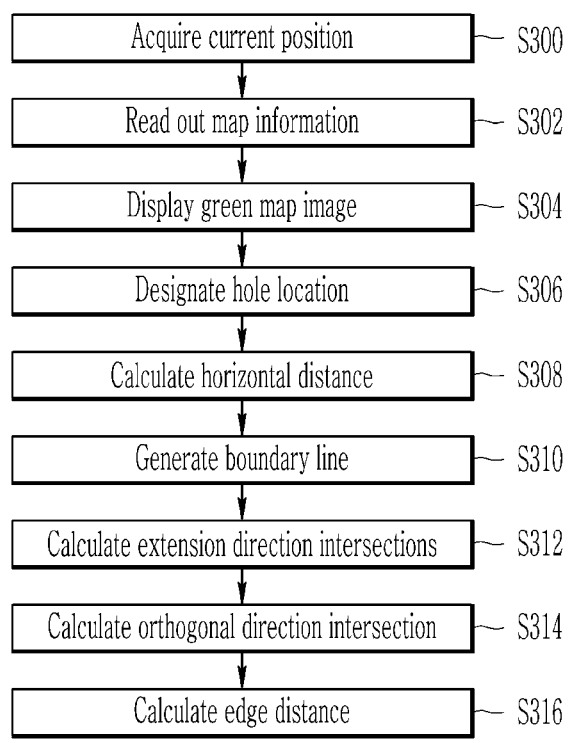
FIG. 11 is a flowchart of a control method of the smart device according to the exemplary embodiment.
Figure 12:
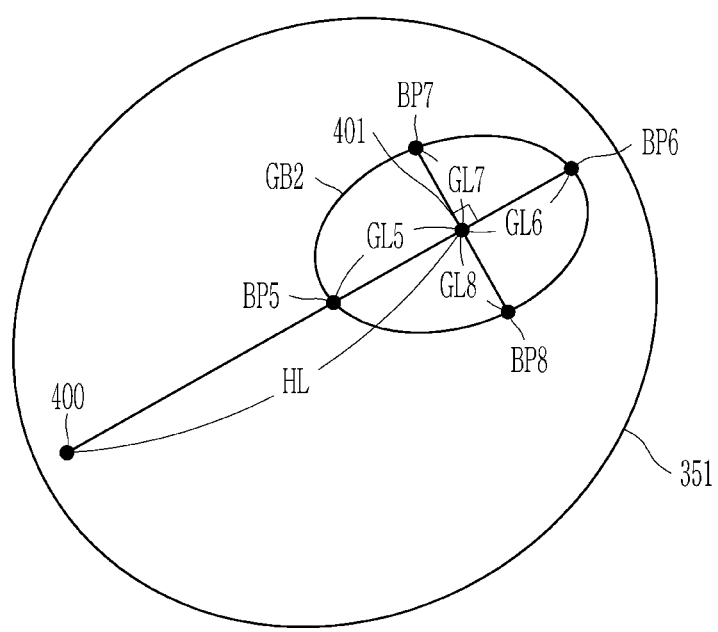
FIG. 12 shows a screen displayed on the display portion of the smart device according to the control method of the smart device.

Referring to FIG. 11 and FIG. 12, a control method of the smart device 300 according to the exemplary embodiment will be described.

FIG. 11 is a flowchart of a control method of the smart device according to the exemplary embodiment, and FIG. 12 shows a screen displayed on the display portion of the smart device according to the control method of the smart device.

First, the location acquisition sensor 321 acquires a current location 400 (S300). The location acquisition sensor 321 may acquire coordinates of the current location 400 of the smart device 300.

The control portion 370 reads out course map information corresponding to the coordinates of the current location 400 from the memory 360 (S302). The course map information may include map image information of a course, accumulation information of a map image, position coordinate information corresponding to reference points of the map image, and the like.

The control portion 370 may determine a course that includes the current location 400 by using position coordinate information corresponding to the reference points of the map image of the course map information (e.g., four corners of the quadrangle-shaped map image are included, but are not limited thereto).

The control portion 370 displays a green map image on the display portion 351 by using the course map information (S304).

When a spot on the green map image is selected by a user, the control portion 370 designates a location corresponding to the selected spot as a hole location (hereinafter, a target) (S306). The control portion 370 may calculate position coordinate information corresponding to the selected spot by using the accumulation information of the map image, and may determine the calculated location coordinate information as coordinate information of a target 401.

The control portion 370 calculates a horizontal distance HL by using coordinate information of the determined target 401 and coordinate information of the current location 400 (S308).

The control portion 370 reads location coordinates indicating a boundary of the green from the course map information, and generates a boundary line GB2 indicating the boundary of the green (S310).

The control portion 370 calculates two extension direction intersection BP5 and BP6 where the boundary line GB2 and the extension direction straight line meet (S312). The extension direction is a direction that connects the current location and the target.

The control portion 370 calculates two orthogonal direction intersection BP7 and BP8 where the boundary line GB2 and the orthogonal direction straight line meet (S314). The orthogonal direction is a direction orthogonal to the extension direction, and a straight line in the orthogonal direction crosses the target 401.

The control portion 370 calculates edge distances GL5 and GL6 between two extension direction intersection BP5 and BP6 and the target 401 and edge distances GL7 and GL8 between two orthogonal direction intersection BP7 and BP8 and the target 401 (S316).

The control portion 370 may output the edge distances GL5 to GL8 with the corresponding horizontal distance HL using the output portion 350.

For example, the control portion 370 may display a value of the horizontal distance HL and the edge distances GL5 to GL8 on the display portion 351, or output as sound by using the acoustic output portion 352. In addition, the control portion 370 may output a vibration indicating that a pin exists at the horizontal distance HL measured using the vibration output portion 353.

According to the control method of the smart device 300 as described above, there is a merit that the user can easily check the location of the hole and a distance from the current location to the hole. In particular, the user can accurately recognize the location of the hole on the green, resulting in a more accurate shot.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. An electronic device comprising:
    a memory where map information of golf courses is stored;
    a location acquisition sensor that acquires a current location;
    a control portion that reads out map information of a golf course corresponding to the current location from the memory, calculates a horizontal distance to a target of the golf course from the current location by using the map information, calculates two first direction intersections where a straight line in a first direction, which connects the current location and the target, and a green boundary line of the golf course meet, calculates two second direction intersections where a straight line, which is perpendicular to the first direction and passes through the target, and the green boundary line meet, and calculates edge distances between the target and the two first direction intersections and between the target and the two second direction intersections;
    an output portion that outputs information with respect to the target and the edge distances; and
    an azimuth sensor that measures an azimuth angle at which the electronic device faces toward the target,
    wherein the control portion calculates coordinates of the target by using the azimuth angle and the first horizontal distance,
    generates a straight line that connects the green boundary line, coordinates of the current location, and the coordinates of the target,
    calculates at least two intersections where the straight line and the green boundary line meet, and
    calculates distances from the coordinates of the current location to the at least two intersections, respectively, and determines the first horizontal distance as the horizontal distance when the first horizontal distance is longer than the shortest distance among the calculated distances and shorter than the longest distance among the calculated distances.

2. The electronic device of claim 1, further comprising:
    a distance measurement sensor that measures a straight distance to the target from the electronic device; and
    an acceleration sensor that measures a tilt angle at which the electronic device faces toward the target,
    wherein the control portion calculates a first horizontal distance according to the measured straight distance and the tilt angle.

3. A method for calculating distance information, comprising:
    acquiring a current location;
    reading out map information of a golf course corresponding to the current location;
    calculating a horizontal distance to a target of the golf course from the current location by using the map information;
    calculating two first direction intersections where a straight line in a first direction, connecting the current location and the target, and a green boundary line of the golf course meet;
    calculating two second direction intersections where a straight line, which is perpendicular to the first direction and passes through the target, and the green boundary line meet;
    calculating edge distances between the target and the two first direction intersections and between the target and the two second direction intersections;
    measuring an azimuth angle at which the electronic device faces toward the target;
    calculating coordinates of the target by using the azimuth angle and the first horizontal distance;
    generating a straight line that connects the green boundary line, the coordinates of the current location, and the target;
    calculating at least two intersections where the straight line and the green boundary line meet;
    calculating distances from the coordinates of the current location to the at least two intersections, respectively;
    comparing the first horizontal distance with the shortest distance and the longest distance among the calculated distances; and
    according to a result of the comparison, determining the first horizontal distance as the horizontal distance when the first horizontal distance is longer than the shortest distance and shorter than the longest distance.

4. The method for calculating the distance information of claim 3, further comprising:
    measuring a straight distance from an electronic device to the target;
    measuring a tilt angle at which the electronic device faces toward the target; and
    calculating a first horizontal distance according to the measured straight distance and the tilt angle.

* * * * *